F. H. GREEN.
MILK TANK WASHER AND STERILIZER.
APPLICATION FILED FEB. 24, 1913.
1,094,785.
Patented Apr. 28, 1914.
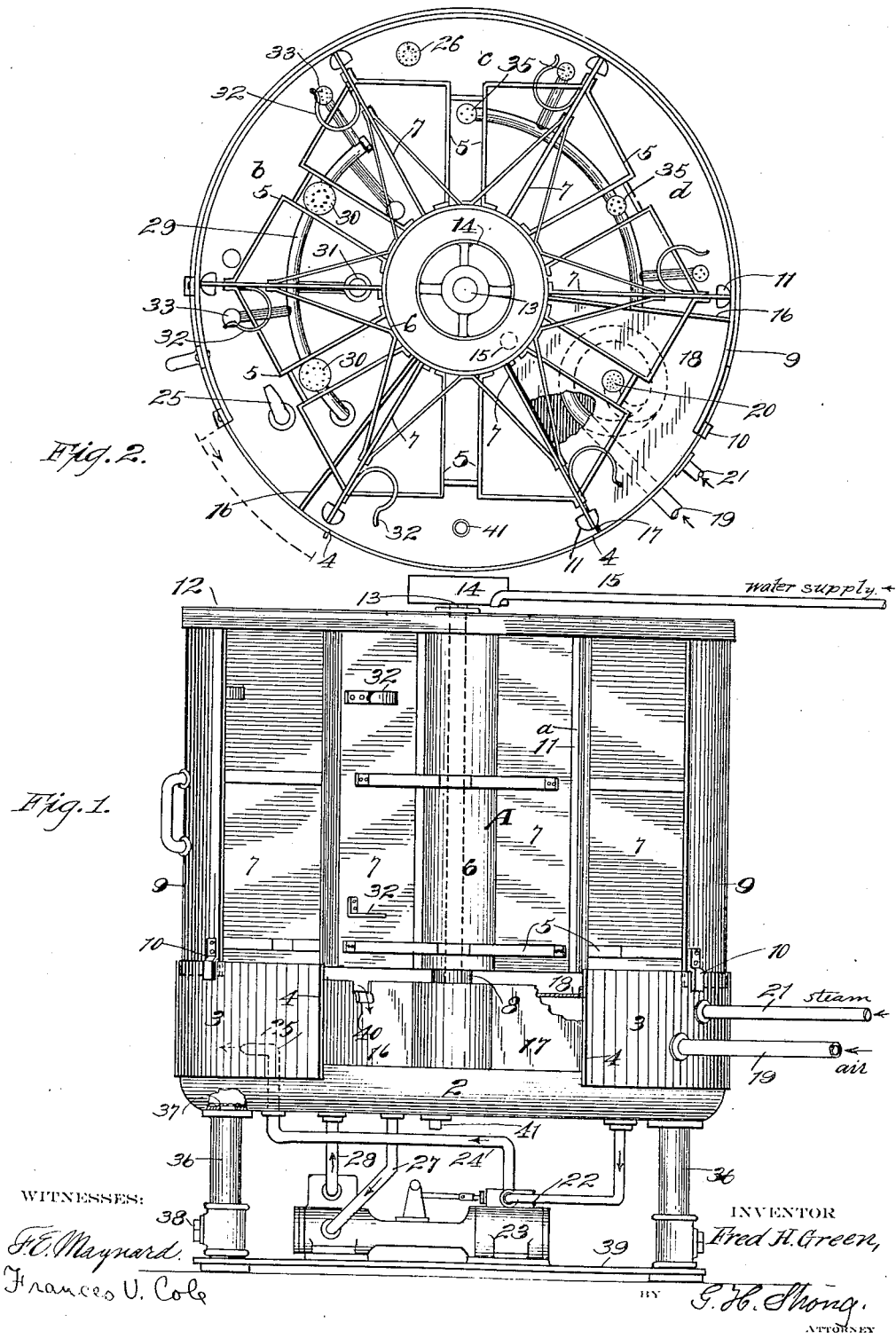

UNITED STATES PATENT OFFICE.

FRED H. GREEN, OF SAN FRANCISCO, CALIFORNIA.

MILK-TANK WASHER AND STERILIZER.

1,094,785.  Specification of Letters Patent.  Patented Apr. 28, 1914.

Application filed February 24, 1913. Serial No. 750,256.

*To all whom it may concern:*

Be it known that I, FRED H. GREEN, a citizen of the United States, residing in the city and county of San Francisco and State of California, have invented new and useful Improvements in Milk-Tank Washers and Sterilizers, of which the following is a specification.

This invention relates to an apparatus for washing, sterilizing and drying containers of various sorts, and particularly for handling milk tanks and cans.

The object of the present invention is to provide a substantial, compact apparatus wherein may be washed, sterilized and dried divers containers, particularly milk tanks.

It is a further object of the present invention to provide an apparatus for washing and cleansing, in successive order, a number of milk containers; the apparatus being so designed as to occupy a comparatively small area and with an arrangement whereby a volume of water may be circulated and used continuously for the washing of cans.

A further object is to provide a container cleansing apparatus involving a collecting tray or receiver superposed upon which is a movable housing within which is turnable a container carrier, and to provide a pump, preferably arranged beneath the tray, for the conservation of space, and to so arrange the apparatus that the supply steam for operating the pump can be utilized in part for heating purposes and so arranged that the exhaust from the pump can be used for heating the water circulated in the apparatus.

The invention consists of the parts and the construction and combination of parts as hereinafter more fully described and claimed, having reference to the accompanying drawings, in which—

Figure 1 is a front elevation of the apparatus with the movable housing turned a little from its normal position. Fig. 2 is a plan view of the apparatus with the cover removed.

In its present embodiment my invention comprises a suitably shaped and proportioned tray, bottom or pan part 2, upon which is formed or secured a segmental rim or wall 3. The front portion of the segmental rim or wall 3 is left open between its parallel edges, as at 4, to form an entrance or gateway through which access may be had to place cans or other containers upon horizontal brackets 5, which are rigidly secured to a carrier A consisting of a central drum 6 and a plurality of compartment forming walls 7 which project radially at even spaces from the circumference and extend longitudinally of the drum 6 which is turnably mounted and supported on a column 8, secured to the bottom or basin 2.

The segmental chambers or compartments, formed between the several radial walls 7, are closed by an exterior arcuate wall or housing 9 having at its lower portion a series of arms or bearings 10 resting upon the upper edge of the lower wall or band 3. The lower edge of the housing 9 projects down slightly below the top edge of the rim 3 to form a water-shedding joint, so that water, being used in the apparatus, will be collected in the basin 2 during operation. Preferably, the opening left between the parallel vertical edges of the segmental housing 9 is approximately equal to the arc formed between two compartments formed between three successive wing partitions 7, and in practice one of the edges of the wall 9 is adjusted in vertical alinement with the vertical edge of the rim 3 at the left of Fig. 1. This is for the purpose of enabling an operator to readily place on and remove from the supporting brackets 5 of the carrier A the containers to be washed and for freely grasping the projecting edge of that particular wing partition 7 which would be exposed, as at *a*, between the edges of the housing 9; whereupon the operator can apply sufficient force to rotate the carrier A to carry a can or other container, adjusted on a support 5, behind the contiguous edge to the left of the closing housing 9, thus bringing the next successive container on the right to a position above the gateway 4, whereupon it can be readily removed.

For the purpose of obtaining a comparatively tight joint between the vertical outer edges of the wing partitions 7 and the inner surface of the housing 9, these outer edges are provided with a suitable packing strip 11 movable into engagement with the surface of the housing and which strip forms a handhold whereby the operator may turn the carrier A. The handhold preferably is of such material that it will be of less temperature, during the operation of the apparatus, than the metal of which the partitions are formed, and for closing the upper portion of the apparatus and completing the chambers between the partitions 7 a suitable top or cover 12 is adjusted on the housing 9, through which cover projects the shaft 13 of the drum or carrier A; the shaft being provided with a pulley 14 for the application of power to revolve the carrier if so desired.

Projecting over the cover 12 and discharging downwardly through the drum 6 of the carrier A is a water supply pipe 15 with which the apparatus may be charged with a supply of water which will accumulate in a collector formed in part by the basin 2, rim 3 and vertical radial walls 16, Fig. 2. Between the vertical walls 16, forming the water collecting chamber, there is arranged another vertical wall 17, Fig. 1, which forms with the adjacent part of the rim 3 and the adjacent wall 16 a closed steam tight chamber with a top wall 18.

Arranged in the steam chamber is a coil of pipe 19, a portion of which is extended outwardly through the rim 3 to connect with a suitable source of air supply, whereby air under pressure is forced through the coil 19 and discharged at a nozzle 20 projecting up through the steam drum top 18. For the purpose of heating the air circulating through the coil 19, steam is admitted from a suitable supply source through a steam pipe 21 discharging into the steam drum, issuing thence through a steam pipe 22 connecting with the steam chest of a pump 23, the exhaust steam from which passes through a pipe 24 which extends to and projects upwardly into the basin 2 and is provided with a nozzle 25 discharging the exhaust steam into the water in the collector for the purpose of heating and circulating or agitating the same during the operation of the apparatus.

Projecting upwardly into the water collecting chamber of the basin 2 is a suction drain 26 which is screened to keep out large particles of substance, the suction drain being connected by a pipe 27 to the suction side of the pump 23 by which it is again returned through a connection 28 to a distributer pipe 29, which may be arranged within the water collection chamber above the basin 2, and which is provided with a series of spray nozzles 30 arranged to project a stream of water upwardly into cans or tanks placed in inverted position on the brackets or supports 5 of the carrier A. The nozzles 30 are so disposed that when the carrier is revolved a portion of a revolution the cans will be brought into position above the water spray nozzles 30, so that the interior of the can may be washed.

For washing the exterior of the containers, there are provided other spray nozzles 31 connected to the supply pipe 29 and also for washing the covers of cans which may be adjusted upon suitable clips or hangers 32, secured to the partitions 7, there is provided a series of water spray nozzles 33, positioned so as to project their sprays against the covers or tops of cans on the hangers 32. The splash of water from the cans and partitions 7 of the carrier A is confined to the interior of the apparatus by the housing 9, which, as before stated, is circumferentially adjustable upon the rim 3 for permitting access to the several nozzles arranged above the tray or pan 2 of the apparatus.

In operation, a can is swung upwardly by an operator through the gateway 4, between the edges of the rim 3, and adjusted upon the supporting brackets 5, whereupon the carrier A may be revolved a part of a revolution to carry the can behind the adjacent edge of the housing 9 where it will be subjected to the washing action of a stream of water forced from the pump 23 through the nozzles 30, 31 and 33; the water being heated by the exhaust spray issuing from the nozzle 25. A can or container remains over the first set of spray nozzles, behind the housing 9, while a can is being removed from and another adjusted upon a support 5 of the carrier A exposed adjacent to the gateway 4. When the carrier is again partly rotated the can will be carried from the first set of water nozzles to the second at b, Fig. 2. From the position b the carrier A carries the can to position c, Fig. 2, where it is subjected to jets or sprays of steam from steam nozzles 35, of which there is also another set at position d, Fig. 2, over which the can will be moved successively from the position c.

Having provided means for subjecting the cans first to streams of water for washing the same and then subjecting the cans to sprays of steam for sterilizing or scalding same, the cans are moved to a position over the steam drum from which projects the nozzle 20, through which a blast of air, heated while traversing the coil 19, is discharged upon the interior of the can for quickly and thoroughly drying the same.

I have shown the washing apparatus, including the pan 2, as superposed upon substantial tubular legs 36 having communication with the bottom of the water compartment, above the pan 2; suitable screens 37 being provided through which sediment collecting during the operation of the apparatus may settle in the legs 36 and be removed therefrom through taps 38 at such intervals as may be necessary. In addition to the advantage of forming traps for sediment from the apparatus, the legs 36 are designed to elevate the apparatus sufficiently to enable the mounting of the pump 23 beneath the pan 2 and thus conserve space in establishments where the apparatus may be in use.

The pump is here shown as mounted above the floor or surface upon a framework or structure 39 secured to the lower portions of the legs 36, thus providing an apparatus which is compact, sanitary, easily accessible and can be shifted from position to position with facility without requiring the breaking of any considerable number of supply pipe joints.

During the operation of the apparatus a small stream of water is constantly supplied through the pipe 15 for the purpose of adding a sufficient excess to the supply in the basin 2 to overflow from a lip 40 in one of the basin walls 16 and thus continually carry off, by skimming, floating scum on the surface of the water which may be conveyed from the basin 2 by a waste 41.

Having thus described my invention, what I claim and desire to secure by Letters Patent is—

1. An apparatus for cleansing containers, said apparatus comprising a bottom portion having a water holding chamber and an annular rim thereabout, a rotary carrier having supports upon which may be deposited the containers to be cleansed, a circumferentially adjustable housing supported upon said rim and open at one side, a cover for the housing, said carrier having a plurality of radial partitions forming compartments closed in part by said housing, and means for discharging cleansing sprays upwardly toward the containers on said carrier in the compartments.

2. An apparatus for cleansing containers, said apparatus comprising a bottom portion having a water holding chamber and an annular rim thereabout, a rotary carrier having supports upon which may be deposited the containers to be cleansed, a circumferentially adjustable housing supported upon said rim and open at one side, a cover for the housing, said carrier having a plurality of radial partitions forming compartments closed in part by said housing, and means for discharging cleansing sprays upwardly toward the containers on said carrier in the compartments, said rim being provided with an opening forming a gateway through which access may be had to place containers to be cleansed on the supports of the carrier.

3. A device for cleansing containers comprising a basin having an upwardly projecting rim with an opening, a segmental casing with an opening between its edges and adjustably supported on the upper edge of said rim, a water containing compartment within the rim and above the basin, a carrier forming separate compartments, each having supports for receiving vessels or articles to be cleansed, and being rotatable within the housing and supported upon said basin, a pump having suction and discharge connections for constantly circulating a charge of water through said compartment, an air coil and its nozzle, and a steam chamber in which said coil is mounted, whereby a heated blast of air may be projected against the vessels.

4. An apparatus for washing, sterilizing and drying containers or other articles, said apparatus comprising a water container, a pump having suction and discharge connections with said container for circulating the water therein, a series of spray nozzles attached to the pump discharge connection for directing sprays of water against articles to be washed, a rotary carrier having supports upon which may be disposed the articles to be washed, said carrier having partitions forming separate compartments, an adjustable housing having a water-shedding joint with and resting upon said water container, said housing closing the compartments of the carrier, and a series of steam discharging nozzles mounted upon the water container for discharging steam against the articles thereon.

5. An apparatus for washing, sterilizing and drying containers or other articles, said apparatus comprising a water container, a pump having suction and discharge connections with said container for circulating the water therein, a series of spray nozzles attached to the pump discharge connection for directing sprays of water against articles to be washed, a rotary carrier having supports upon which may be disposed the articles to be washed, said carrier having partitions forming separate compartments, an adjustable housing having a water-shedding joint with and resting upon said water container, said housing closing the compartments of the carrier, a series of steam discharging nozzles mounted upon the water container for discharging steam against the articles thereon, and an air blast nozzle arranged upon the water container for discharging a blast of air against said articles.

6. An apparatus for washing, sterilizing and drying containers or other articles, said apparatus comprising a water container, a pump having suction and discharge connections with said container for circulating the water therein, a series of spray nozzles attached to the pump discharge connection for directing sprays of water against articles to be washed, a rotary carrier having supports upon which may be disposed the articles to be washed, said carrier having partitions forming separate compartments, an adjustable housing having a water-shedding joint with and resting upon said water container, said housing closing the compartments of the carrier, a series of steam discharging nozzles mounted upon the water container for discharging steam against the articles thereon, an air blast nozzle arranged upon the water container for discharging a blast of air against said article, and a steam-tight chamber for heating the air discharged by said nozzle.

7. An apparatus for cleansing milk containers or other articles comprising a basin with a compartment for holding water, nozzles for discharging water upwardly above the compartment, a rotary carrier superposed upon the basin and having a plurality of radial partitions forming separate compartments, and a segmental, adjustable housing resting upon the basin for closing the compartments, said partitions having devices along their outer edges for making a substantially water-tight joint with the inner surface of the housing.

In testimony whereof I have hereunto set my hand in the presence of two subscribing witnesses.

FRED H. GREEN.

Witnesses:
 IRVINE SINNETT,
 W. W. HEALEY.